H. W. QUADE.
BELT DRIVE FOR CURD MILLS.
APPLICATION FILED OCT. 11, 1916.
1,223,107.
Patented Apr. 17, 1917.
2 SHEETS—SHEET 2.
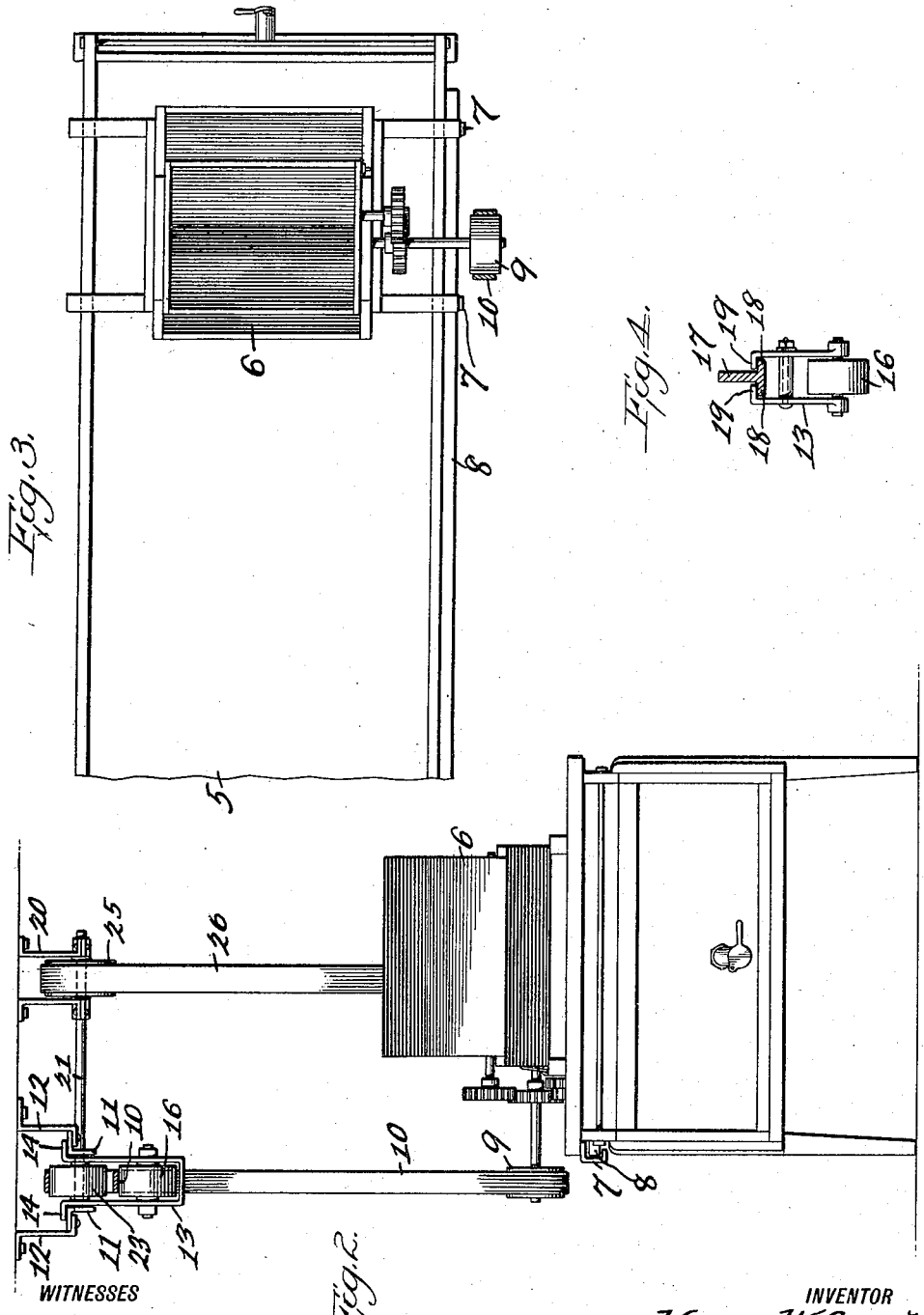
WITNESSES
INVENTOR
Henry W. Quade
BY
ATTORNEYS

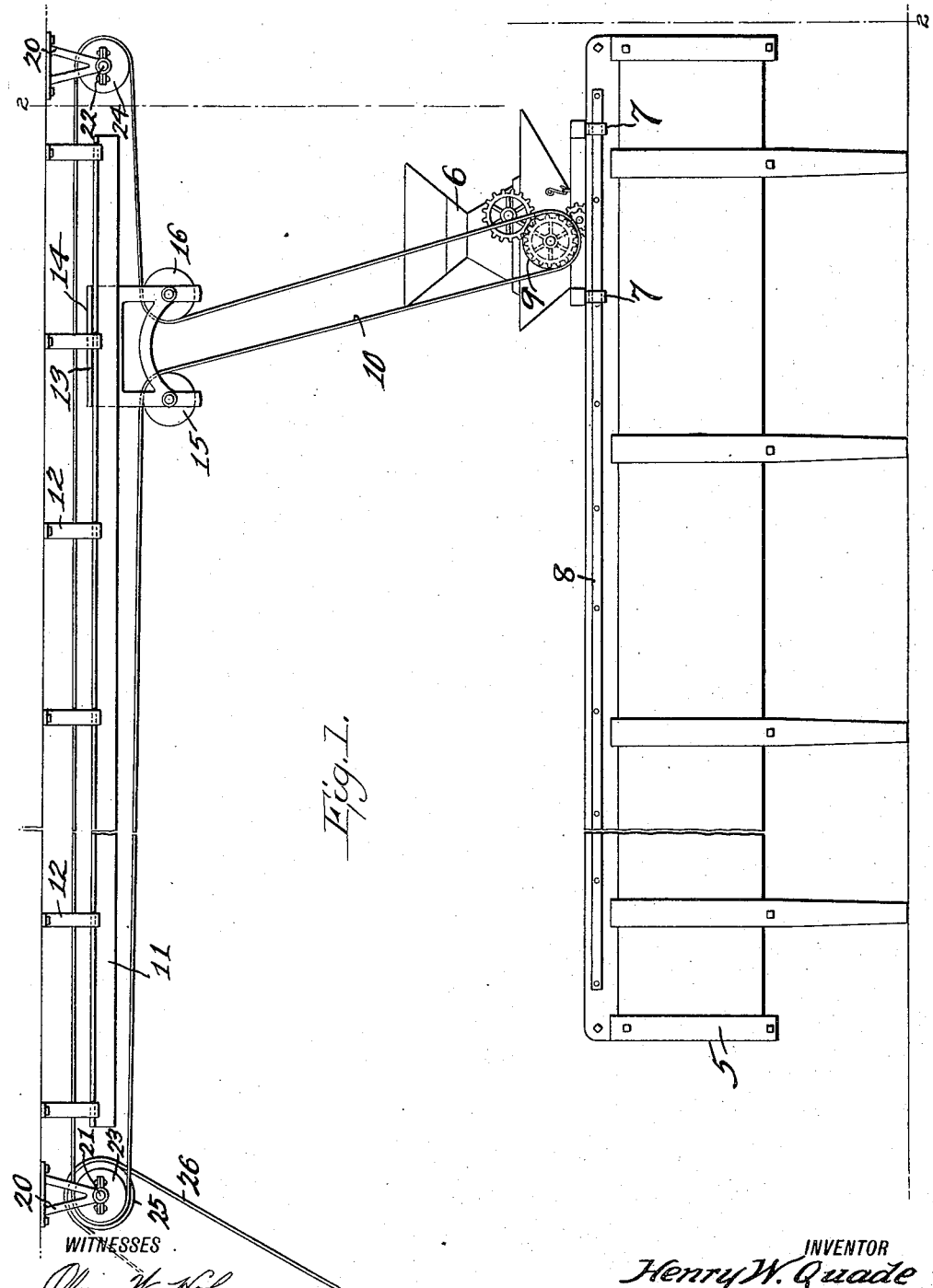

UNITED STATES PATENT OFFICE.

HENRY W. QUADE, OF KEWASKUM, WISCONSIN.

BELT-DRIVE FOR CURD-MILLS.

1,223,107.  Specification of Letters Patent.  Patented Apr. 17, 1917.

Application filed October 11, 1916. Serial No. 124,999.

*To all whom it may concern:*

Be it known that I, HENRY W. QUADE, a citizen of the United States, and a resident of Kewaskum, in the county of Washington and State of Wisconsin, have invented certain new and useful Improvements in Belt-Drives for Curd-Mills, of which the following is a specification.

My invention relates to curd mills, as used upon a vat containing the curds to be cut or shredded, and the main object thereof is to provide means whereby a power driven mill may be moved to any desired point along the length of the vat without interference with the power connections, thus overcoming the present loss of time, inconvenience, and expense, due to the necessity for carrying the curds to the mill instead of, as in my invention, carrying the mill to the curds.

My invention is fully described in the following specification, of which the accompanying drawings form a part, in which like characters refer to like parts in each of the views, and in which:—

Figure 1 represents a conventional curd mill arranged upon a vat and slidably held thereon, together with the power means the operation of which is not interfered with while the mill is being moved longitudinally of the vat;

Fig. 2 is a section taken on the line 2—2 of Fig. 1;

Fig. 3 is a top plan view of the mill and vat; and

Fig. 4 is a fragmentary section of a modification of the belt carrier shown in Figs. 1 and 2.

Referring to the drawings, 5 represents a conventional vat having a conventional power mill 6 on the top thereof and slidably held thereon by means of hooks 7 engaged with a strip 8 secured adjacent the upper edge and at one side of the vat, only one of these strips being necessary as will be later seen, and the drive shaft of said mill carries a pulley 9 rotated by means of a belt 10.

Arranged over the vat 5 is a pair of spaced parallel angle bars 11 held by hangers 12 and serving as a track for a belt carrier 13 having outwardly directed arms 14 bearing on the upper surfaces of said angle bars, said carrier being provided with two pulleys 15 and 16.

In Fig. 4 is shown a slight modification over the track formation just described in that I employ an inverted T-iron or an I-iron 17 the upper surfaces of the lower outwardly directed flanges 18 of which serve as bearings for the inwardly directed arms 19 of the carrier 13.

Arranged adjacent the ends of the track are hangers 20 for shafts 21 and 22 carrying pulleys 23 and 24 respectively, and the shaft 21 also carries a pulley 25 connected, by means of a belt 26, with the power plant, not shown.

The belt 10 is of sufficient length to pass around the pulleys 23 and 24, 15 and 16, and mill pulley 9, the illustration being of a belt somewhat stretched whereas in the unstretched belt condition the mill pulley 9 will be directly beneath the guide pulleys 15 and 16 so as to exert a tension on the belt at all times regardless of the direction of mill movement on the vat.

By means of this construction it will be seen that the belt carrier will follow the sliding movement of the mill and will continue to actuate the latter at all times, and the hooks 7 and strip 8 are needed on the same side of the vat as the mill pulley 9 because this is the only side upon which the belt 10 exerts an upward pull on the mill, but I may duplicate the hook and strip arrangement on the other side of the vat if desired.

It will thus be seen that the mill may be moved to the position of the curds instead of carrying the curds to it and no upward movement of the mill is possible because of the hooks and strip 8, and the mill is constantly driven.

While I have shown a present preferred embodiment of my invention, I do not desire to be limited thereto but may make changes therein provided such changes come within the spirit of my invention and within the scope of the appended claim.

Having fully described my invention, what I claim as new, and desire to secure by Letters Patent, is:—

The combination, adapted for use in a curd mill, of a rotating shaft arranged on a horizontal axis and movable in a horizontal plane, means for guiding said shaft in its horizontal movement, and means for rotating said shaft in such horizontal movement, said means comprising a horizontal track, a carrier movable thereon, rollers on said carrier, pulleys at the ends of said track, a pulley on said shaft, an endless belt passed around all of said pulleys and guided by said carrier rollers, and means for driving one of said track pulleys.

HENRY W. QUADE.